Patented June 18, 1935

2,005,678

UNITED STATES PATENT OFFICE 2,005,678

ESTERIFICATION OF CELLULOSE

Georg Jayme, Hawkesbury, Ontario, Canada, assignor to Canadian International Paper Company, Hawkesbury, Ontario, Canada No Drawing. Application September 4, 1931, Serial No. 561,307. In Canada June 30, 1931

2 Claims. (Cl. 260—101)

This invention relates to the esterification of cellulose and more particularly to the acetylation of wood cellulose, such as bleached sulphite, soda or sulphate pulp.

Heretofore various processes for making wood cellulose suitable for esterification have been proposed involving the use of organic solvents or caustics under varying conditions of temperature, but the amount of chemicals used and the general cost of the treatment brought the price of thus-treated pulps into the neighborhood of that of cotton linters and thus their successful economic use for acetylation purposes is problematical.

Pulp from wood and other cellulosic materials usually contains impurities, such as pentosan and other hemi-celluloses, ligneous residues, fats, waxes and resins, and the undesirable influence of these impurities is well known to those skilled in the art. They reduce the activity of the pulp in reacting with the esterifying reagents and yield an impure ester.

It is evident that these impurities and incrusting materials protect the cellulose in the fibre of the pulp from the attack of the esterifying reagents and thus the reaction proceeds slowly and reluctantly. It is, therefore, necessary to force the reaction by the uneconomic use of large quantities of the reagents, high temperatures and lengthy reaction periods. Furthermore, in the presence of these impurities, the attack of the reagents is uneven resulting in the production of esters which are not homogeneous. When such esters are dissolved their solutions are difficult to filter, cannot be spun without trouble and when evaporated leave uneven films of little value. Moreover, these solutions contain certain amounts of coloured matter which confer, for example, on films prepared from them a distinct yellowish tinge, which considerably decreases their commercial value.

The object of this invention is to oversome these difficulties and to provide a simple, economical method for the production of cellulose esters.

The invention will now be described with particular reference to the production of cellulose acetate although it is equally applicable to the production of other esters by the use of the esterifying reagent required for the ester desired.

The cellulose in the form of wood pulp, for instance, is first subjected to a pretreatment with acetic acid to increase the reactivity of the material before acetylation actually begins. This is preferably carried out at a low temperature for a substantial period of time, in order to insure a uniform attack on the fibres so that they will be evenly prepared for acetylation. Sulphuric acid or other known catalyzers for this purpose may be incorporated with the acetic acid in this pretreatment. In fact in most instances it will probably be found desirable to use the catalyzer although a very sensitive cellulose material will not require it. This treatment dissolves substantially all the impurities leaving the cellulose of the fibre free for acetylation. At this stage of the process, in accordance with this invention, the liquor surrounding the fibres is removed and the fibres are washed free from impurities with acetic acid. This removes from the cellulose the substances which in usual practice cause the discolouration of the finished acetate and the products made therefrom. Acetylation is then carried out with acetic acid, acetic anhydride and a catalyst in accordance with any of the well known methods and the primary acetate obtained is converted into the acetone-soluble product in the usual manner. A white acetone-soluble product is obtained which may be converted into practically colourless films of high flexibility and transparency, or it may be used for the manufacture of acetate rayon, lacquers, plastics and the like.

By way of further illustration, a specific example of the operation of the process will now be given.

100 kg. of bleached, air dry sulphite pulp in loose form, with an alpha cellulose content of 87.5% is thoroughly moistened with a solution of 20 kg. of sulphuric acid in 350 kg. of acetic acid, subjected to slight pressure and allowed to stand for 10 days at 35° C. Thereafter 500 kg. of acetic acid is added with stirring to cause the fibres to separate into fine particles in suspension. The material is filtered, pressed and washed again with 300 kg. of acetic acid and pressed down to a mass weighing about 300 kg. The mass is now ready for acetylation, which is effected with 200 kg. of acetic acid, 350 kg. of acetic anhydride and 10 kg. of sulphuric acid. After a fibre-free solution is obtained, sufficient acetic acid of 60% concentration, containing dissolved 5 kg. of sulphuric acid, is added to give a final acetic acid concentration of 96% after the saponification of excessive anhydride. The solution is allowed to stand until the acetate has become acetone soluble, when it is precipitated with water, washed free from acids and dried carefully.

The yield depends upon the character of the raw material and the acetic acid content of the acetate formed. In this specific example the yield is substantially 90% of the theoretical and the acetate formed is practically the alpha cellulose acetate.

It will be apparent that the amount of reagents used and the time and temperature employed during the pretreatment will vary with the character and purity of the raw material and the character of the acetate desired.

out and the acetic acid used for washing and removed from the cellulose, as well as the catalyst, may be recovered and made available for reuse.

It, of course, will be obvious that if other esters, such as formates, butyrates or the like, are required, the reagent and catalyst used for the pretreatment, as well as the esterification, will be chosen accordingly. The reagents used in pretreatment and washing must of course be neutral to the esterification step of the process.

I claim:—